(12) United States Patent
Osborn et al.

(10) Patent No.: US 12,401,498 B2
(45) Date of Patent: Aug. 26, 2025

(54) CUSTODIAL DIGITAL WALLET MANAGEMENT SYSTEMS

(71) Applicant: Capital One Services, LLC, McLean, VA (US)

(72) Inventors: Kevin Osborn, Newton Highlands, MA (US); Srinivasa Chigurupati, Long Grove, IL (US)

(73) Assignee: Capital One Services, LLC, McLean, VA (US)

( * ) Notice: Subject to any disclaimer, the term of this patent is extended or adjusted under 35 U.S.C. 154(b) by 698 days.

(21) Appl. No.: 17/711,810

(22) Filed: Apr. 1, 2022

(65) Prior Publication Data
US 2023/0318808 A1    Oct. 5, 2023

(51) Int. Cl.
*H04L 9/08* (2006.01)
*G06Q 20/36* (2012.01)
*H04L 9/14* (2006.01)
*H04L 9/30* (2006.01)
*H04L 9/32* (2006.01)
*G06Q 20/38* (2012.01)
*H04L 9/00* (2022.01)

(52) U.S. Cl.
CPC ......... *H04L 9/0825* (2013.01); *G06Q 20/363* (2013.01); *G06Q 20/367* (2013.01); *H04L 9/14* (2013.01); *H04L 9/3066* (2013.01); *H04L 9/3234* (2013.01); *H04L 9/3247* (2013.01); *G06Q 20/3829* (2013.01); *H04L 9/50* (2022.05); *H04L 2209/56* (2013.01)

(58) Field of Classification Search
CPC ....... H04L 9/0825; H04L 9/14; H04L 9/3066; H04L 9/3234; H04L 9/3247; H04L 9/50; H04L 2209/56; H04L 9/0877; G06Q 20/363; G06Q 20/367; G06Q 20/3829; G06Q 20/36
See application file for complete search history.

(56) References Cited

U.S. PATENT DOCUMENTS

| | | | | |
|---|---|---|---|---|
| 10,615,969 B1* | 4/2020 | Griffin | .................. | H04L 9/0897 |
| 10,615,970 B1* | 4/2020 | Griffin | .................. | H04L 9/0822 |
| 2005/0138374 A1* | 6/2005 | Zheng | .................. | H04L 9/0894 |
| | | | | 713/166 |
| 2011/0099367 A1* | 4/2011 | Thom | .................. | H04L 9/3247 |
| | | | | 713/181 |
| 2014/0074724 A1* | 3/2014 | Gordon | .................. | G06Q 20/40 |
| | | | | 705/44 |
| 2016/0364722 A1* | 12/2016 | Nair | .................. | G06F 21/6254 |

(Continued)

*Primary Examiner* — Khalid M Almaghayreh
(74) *Attorney, Agent, or Firm* — Banner & Witcoff, Ltd.

(57) ABSTRACT

Systems and methods, as described herein, relate to increasing the functionality and security of digital wallets. These methods, techniques, and infrastructure may use hardware security modules (HSMs) to manage a plurality of cryptocurrency wallets in a custodial capacity. The HSMs may have functionality incorporated therein improve the functionality and security of cryptocurrency wallets. The aspects discussed herein may also relate to methods, techniques, and infrastructure to securely manage signing keys and cryptocurrency addresses contained in cryptocurrency wallets for a plurality of accounts that may be associated with a user account or user account identifier without exposing the keys to being stolen or otherwise comprised.

17 Claims, 5 Drawing Sheets

(56) References Cited

U.S. PATENT DOCUMENTS

| | | | | |
|---|---|---|---|---|
| 2018/0367316 A1* | 12/2018 | Cheng | ................ | G06F 21/72 |
| 2019/0370790 A1* | 12/2019 | Spector | .............. | G06Q 20/4097 |
| 2021/0056547 A1* | 2/2021 | Monica | ................ | H04L 9/3247 |
| 2021/0119807 A1* | 4/2021 | Chen | ................ | H04L 9/3242 |
| 2024/0330911 A1* | 10/2024 | Ghosh | ................ | G06Q 20/223 |

\* cited by examiner

CUSTODIAL DIGITAL WALLET MANAGEMENT SYSTEMS

FIELD OF USE

Aspects of the disclosure generally relate to digital wallets and the managing thereof and more specifically to secure management of digital wallets.

BACKGROUND

Digital wallets, such as cryptocurrency wallets, are used by end users and businesses to store information pertaining to ownership and amounts of various types of cryptocurrencies. Digital wallets may be maintained by custodial systems. However, custodial systems have difficulties with performing transactions using the custodially managed digital wallets. For example, transactions may be limited. Furthermore, keys used to generate signatures, and otherwise conduct transactions, may be exposed and/or compromised, which could result in theft of the cryptocurrency.

Aspects described herein may address these and other problems, and generally improve the quality, efficiency, and security of custodial systems for digital wallets.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems, as described herein, may use hardware security modules (HSM(s)) to increase the security of digital wallets, such as cryptocurrency wallets. Specifically, custodial digital wallet management systems may use HSMs to improve the security of digital wallets. The use of HSMs may allow for each customer to have one or more unique digital wallets. Each of the one or more unique wallets may have a unique asymmetric key pair associated with the digital wallet. Furthermore, a user's balance may be derived from a public block chain without exposing a key associated with the digital wallet. That is, each key (e.g., public and/or private key) may never be exposed to a memory of a user computing system, which would otherwise potentially leave it exposed and able to be compromised, while still allowing for functionality, such as cryptocurrency transactions and derivation of balances from a system of record (e.g., from a public blockchain).

A computer-implemented method may comprise receiving, by a computing device, a request from a user for a cryptocurrency transaction. The method may further comprise retrieving a master key from a secure memory location associated with a hardware security module. The master key may be associated with a financial institution. The method may further comprise deriving, by the hardware security module ad using the master key, a plurality of private keys associated with a plurality of users. The plurality of private keys may include a private key associated with the user. The method may further comprise deriving, based on the private key, a public key. The method may further comprise, generating, by the hardware security module and using the private key, a digital signature associated with the cryptocurrency transaction. The method may further comprise storing the cryptocurrency transaction and the digital signature in a distributed ledger.

In some implementations, a computer-implemented method may further comprise receiving a second request from a second user for a second cryptocurrency transaction, deriving, by the hardware security module and using the master key, a second private key associated with the second user, and deriving, based on the second private key, a second public key. The method may further comprise generating, by the hardware security module and using the second private key, a second digital signature associated with the second cryptocurrency transaction. The method may further comprise storing the second cryptocurrency transaction and the second digital signature in the distributed ledger. Storing the cryptocurrency transaction and the digital signature in the distributed ledger may comprise transmitting the digital signature to the distributed ledger.

In some implementations, the method may further comprise deriving, by the hardware security module, the private key and the public key using the master key and an account identifier received with the request. In some implementations, the method may further comprise deriving, by the hardware security module, the private key and an associated transaction public key using an account identifier, the master key, and a value of a counter. The private key may comprise a unique transaction key for the cryptocurrency transaction. In some implementations, the method may further comprise deriving, by the hardware security module, the private key and the public key from the master key and diversification data received with the request. The private key and the public key may be maintained securely within the hardware security module. The hardware security module may be further configured to store the private key and the public key in a digital wallet associated with an account identifier. The private key and the public key from the master key may be derived using elliptic curve cryptography.

In some implementations, computing systems may comprise a hardware security module, one or more processors, and memory storing instructions that, when executed by the one or more processors, cause the computing system to execute the steps of any of the methods described above.

In some implementations, a non-transitory computer-readable storage medium may comprise instructions. The instructions, when executed, may cause a computing system to execute the steps of any of the methods described above.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration, various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods, techniques, and infrastructure for increasing the functionality and security of digital wallets. These methods, techniques, and infrastructure may include a custodial digital wallet management system that uses hardware security modules (HSMs) to increase the functionality and security of digital wallets. The aspects discussed herein may also relate to methods, techniques, and infrastructure to securely manage signing keys and cryptocurrency addresses contained in digital wallets for a plurality of accounts that may be associated with a user account or user account identifier.

HSMs may increase the functionality and security of digital wallets by being configured to create, store, and/or manage new digital wallets. HSMs may further store master keys and derive new private keys and public keys (e.g., asymmetric key pairs) from the master keys. Security is increased by containing key management and/or cryptographic functions inside the HSM. For example, an HSM may receive a request for a new digital wallet. In response to the request, the HSM may be configured to derive an asymmetric key pair. The private key may be derived from a master key associated with the HSM. The HSM may be further configured to use the private key to digitally sign a cryptocurrency transaction without any of the keys being exposed outside of the HSM.

In some implementations, one or more master keys may be stored in an HSM. The one or more master keys may be associated with a financial institution. Additionally, the one or more master keys may be used to create one or more unique account identifiers. In some examples, the account identifiers are existing account numbers, primary account numbers (PANs), and the like. In some examples, the account identifiers are the primary key for accessing customer information including other accounts.

In some implementations, when a user initiates a cryptocurrency transaction, a digital wallet is created dynamically. The created digital wallets may be associated with a user and used to store an asymmetric key pair associated with the cryptocurrency transaction. The asymmetric key pair may be created using a master key and may be the same keys for repeatability and access. The HSM may be configured to handle the generation of the keys of the asymmetric key pair as well as digital wallet management. Digital wallet management may include digitally signing transactions. The HSM may also be configured to dynamically create new digital wallets as needed.

Systems and methods for secure digital wallet management, as described herein, allow for the implementation of secure cryptocurrency transactions to a distributed network. A distributed network may be a blockchain network including a decentralized and distributed system that hosts distributed ledgers or blockchains among a set of computer nodes that may record transactions efficiently and in a verifiable and permanent way. The distributed ledgers may comprise blocks of transactions or records and other information pertinent to the blocks. Each block may contain a cryptographic hash and/or a pointer comprising an indication of the previous block, thereby creating a chain of blocks. The pointer may be an address of the previous block and/or a hash pointer comprising a hash of the data inside the previous block. The distributed ledger may create a permanent and unalterable electronic ledger of all transactions which have been written to the ledger since its inception. Transactions may include transaction of consumers associated with credit cards issued by the organization, transactions of consumers at merchants, transactions awarding points to consumers, transactions related to consumers redeeming points for free good and services, transactions related to merchants settling points with the organization, etc. Examples of popular blockchain networks include Ethereum, Eris, Multichain, Bitcoin, Litecoin, Hyperledger Fabric, Credo Blockchain, and Hyperledger Corda. Secure cryptocurrency transaction systems, as described herein, may store transactions in a distributed ledger in a blockchain network. The distributed ledger may be stored on a series of decentralized devices acting as nodes, each having a copy of a distributed ledger managed on the node. In some embodiments, the organization may manage anode of the distributed network. In some embodiments, one or more participating merchants may each manage anode in the distributed network.

Transactions in the distributed ledger may be validated by one or more encryption keys of the consumers and/or merchants associated with the transactions. Encryption keys may be uniquely identified and linked to the owner of the encryption keys. The encryption keys may comprise an asymmetric key pair that includes a public key which may be disseminated widely, and a private key which may only be known to the owner of the private key. Encryption keys also may be used to generate and/or verify electronic or digital signatures.

Each participating consumer and merchant using the secure digital wallet management system may be associated with a digital wallet. A digital wallet may maintain one or more private keys held by the account holders. Further, a digital wallet may support the execution of transactions by which users send or receive currency or points, pay for goods and services, earn points, settle points, etc. In some embodiments, the HSM may host its own digital wallet.

The systems and methods described herein may improve the functioning of computer systems by securely managing transactions between digital wallets without exposing and/or compromising the public/private key pairs used by the digital wallets.

Figure 1:
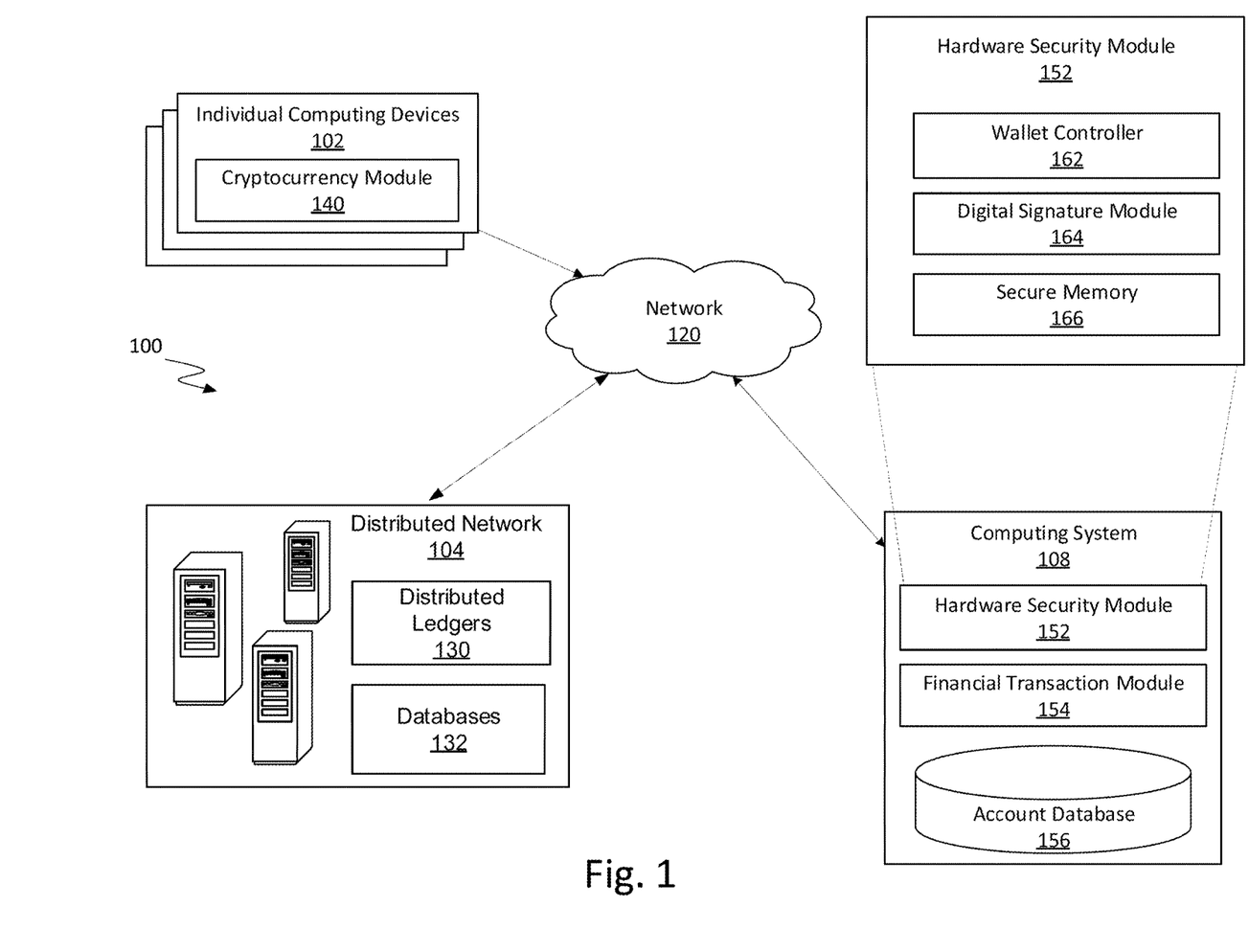
FIG. 1 depicts an illustrative cryptocurrency processing system that may be used in accordance with one or more illustrative aspects described herein.

Turning to FIG. 1, a system 100 is depicted that may include one or more individual computing devices 102, a computing system 108, a distributed network 104, and a network 120. The one or more individual computing devices 102, computing system 108, and/or the distributed network 104 may be communicatively connected to each other through the network 120. The network 120 may include the Internet, inclusive of the mobile Internet, as well as alternately or in addition a LAN (local area network), a WAN (wide area network), telephone network (Public Switched Telephone Network (PSTN), Session Initiation Protocol (SIP), wireless network, point-to-point network, star network, token ring network, hub network, via protocols such as EDGE, 3G, 4G LTE, Wi-Fi, 5G and WiMAX. Additionally, a variety of authorization and authentication techniques, such as username/password, Open Authorization (OAuth), Kerberos, SecureID, digital certificates, and more, may be used to secure the communications. It will be appreciated that the network connections shown in the system 100 are illustrative, and any means of establishing a communications link between the components, devices, or systems may be used. The data transferred to and from various components, devices, or systems in the system 100 may include secure and sensitive data, such as confidential documents, customer personally identifiable information, and account data. Therefore, it may be desirable to protect the transmissions of such data using secure network protocols and encryption, and/or to protect the integrity of the data when stored on the various devices.

The one or more individual computing devices 102 may be one or more devices, such as a cellular phone, a mobile phone, a smart phone, a tablet, a laptop, or a computing device, like a desktop computer, laptop computer, or, alternatively, a virtual computer. The one or more individual computing devices 102 may be configured to provide a user access to various applications and services. For example, one of the one or more individual computing devices 102 may provide a user with access to the Internet. Additionally, one of the one or more individual computing devices 102 may provide a user with one or more applications located thereon. The one or more applications may provide the user with a plurality of tools and access to a variety of services. In some embodiments, the one or more applications may include a cryptocurrency module 140.

In some implementations, cryptocurrency module 140 may be configured to access a digital wallet, such as a digital wallet, located on another computing system (e.g., computing system 108). Accessing the digital wallet may allow for access to transacting cryptocurrencies associated with the digital wallet. For example, accessing the digital wallet may allow for a request to transfer an amount of cryptocurrency from a first address associated with the cryptocurrency to a second address associated with the cryptocurrency. In another example, accessing the digital wallet may allow for receiving cryptocurrency. In some examples, the request may include information relating to one or more of an identity of a holder of cryptocurrency, account information of a cryptocurrency account of a sender or recipient of cryptocurrency, a type of cryptocurrency to be used in the transaction, an amount of cryptocurrency, and the like.

In some implementations, cryptocurrency module 140 may be configured to send a request for a new private and public key pair. For example, the request may be to create a new digital wallet for storing cryptocurrency. In some implementations, the request is for a hardware security module (HSM) (e.g., HSM 152) to create, store, and manage a new digital wallet. In some examples, the request may include information relating to one or more of an identity of a holder of cryptocurrency, account information of a cryptocurrency account, a type of cryptocurrency to be held in the digital wallet, an amount of cryptocurrency to be held in the digital wallet, and the like.

Computing system 108 may be a stand-alone server, a corporate server, a server located in a server farm or cloud-computer environment, or a virtual server hosted on hardware capable of supporting a plurality of virtual servers. Computing system 108 may be associated with a financial institution, such as a bank, a brokerage house, an investment firm, an exchange platform or the like. Computing device 108 may include an HSM 152, a financial transaction module 154, and/or an account database 156. The various components of computing system 108 may be described as configured to perform one or more functions as described herein. The one or more functions may be performed by other components as described in computing system 108 and by a combination of one or more components of computing system 108.

The HSM 152 may comprise a physical computing device configured to safeguard and/or manage one or more encryption keys (e.g., symmetric keys, asymmetric key pairs, etc.). The HSM 152 may also be configured to perform encryption and decryption functions for digital signatures, authentication, and other cryptographic functions. The HSM 152 may be a plug-in card that connects to the computing device 108. Alternatively, the HSM 152 may be an external device that attaches directly to the computing device 108. The HSM 152 may comprise one or more cryptoprocessor chips (not shown). Additionally, the HSM 152 may comprise a wallet controller 162, a digital signature module 164, and a secure memory 166.

The HSM 152 may be configured to receive a request for a private and public key pair. For example, the request may be to create a new digital wallet for storing cryptocurrency. In some implementations, the wallet controller 162 may be configured to create, store, and/or manage a new digital wallet. In some examples, the request may include information relating to one or more of: an identity of a holder of cryptocurrency, account information of a cryptocurrency account, a type of cryptocurrency to be held in the digital wallet, an amount of cryptocurrency to be held in the digital wallet, and the like. In some examples, the request may be to generate a new asymmetric key pair (e.g., a private and public key pair). The generation of a new asymmetric key pair may be part of a key refresh or key update procedure.

The HSM 152 may receive a request for a new cryptographic wallet. In response to the request, the HSM 152 may derive an asymmetric key pair (e.g., a public key and a private key). The private key may be derived before the public key. For example, the HSM 152 may be configured to derive a private key using a master key. A master key may be used to encrypt cryptographic keys (e.g., an asymmetric key pair comprising a public key and a private key, used in a system. Deriving a private key may include combining the master key with a number (e.g., a seed value) to create a uniquely derived key. The seed value may be an account number associated with the request. The seed value may be another predetermined number that is associated with an account number. The uniquely derived key may be used as a private key of a private/public key pair. In some implementations, the uniquely derived key used as a private key may be re-creatable using the master key and the number (e.g., an account number associated with the request). The master key may be a key generated from a seed phrase. A seed phrase may be a series of words or a mnemonic phrase that are easier to remember than the equivalent in hexadecimal or binary and used to create a master seed. The master seed may allow for the re-creation or recovery of a plurality of private keys that are derived from the master key. In some implementations, this is accomplished through use of an elliptic curve. For example, a hardware security module (e.g., HSM 152) may use the master key to derive a plurality of private keys using elliptic curve cryptography. Each of the plurality of private keys may be associated with a different user.

The HSM 152 may be configured to derive a public key for each of the private keys. In some implementations, the public key may be mathematically derived from a private key. In another implementation, the public key may be derived by projecting a line through points on an elliptic curve. In some implementations, the public key may be recreated using the master key and the number (e.g., an account number associated with the request) by first deriving the private key.

The HSM 152 may further be configured to derive a key pair using an account identifier and a value of a counter. Deriving the key pair may comprise deriving a private key first. The private key may be derived using a master key. In some implementations, deriving a private key may include combining the master key with a number (e.g., a seed value) and a counter to create a uniquely derived key. The seed value may be an account number associated with the request. The seed value may be another predetermined number that is associated with an account number. The uniquely derived key may be used as the private key of the private/public key pair. In some implementations, the uniquely derived key used as a private key may be recreated using the master key, the number (e.g., an account number associated with the request), and/or the counter. The master key may be a key generated from a seed phrase. The master seed may allow for the re-creation or recovery of a plurality of private keys that are derived from the master key. The master key may allow for the generation of derived private keys. In some implementations, this is accomplished through use of an elliptic curve. A public key based on the private key may be derived to form a public/private key pair. In some implementations, the public key may be mathematically derived from the private key. The public key may be derived, for example, by projecting a line through multiple points on an elliptic curve. In some implementations, deriving the public key may be re-created after first deriving the private key. Diversification functions described herein may also use other secret information when generating the diversified results. In some implementations, this secret information is stored only in the HSM (e.g., HSM 152).

The HSM 152 may include a digital signature module 164. Digital signature module 164 may be configured to generate a digital signature associated with a cryptocurrency transaction, for example, using a digital signature algorithm, such as Elliptic Curve Digital Signature Algorithm (ECDSA). The derived private key may be used to generate the digital signature and the corresponding public key may be used to verify the signature. For example, the derived private key may be used to generate a digital signature for a cryptocurrency transaction using data associated with the transaction. After the transaction is committed to a public ledger, the digital signature may be verified using the corresponding public key. In general, cryptographic keys, such as the derived private/public key pair, may be used to digitally sign data in way that complies with smart contracts in blockchain and distributed ledger technology environments, or to enable entity authentication.

The HSM 152 may comprise a secure memory 166. The secure memory 166 may be configured to store a public/private key pair securely. In some implementations, the secure memory 166 may be configured to store the key pair in a digital wallet. The digital wallets managed by an HSM may be stored in a secure memory (e.g., secure memory 166). The HSM may use a wallet controller (e.g., wallet controller 162) configured to manage digital wallets stored by the HSM.

The financial transaction module 154 may be configured to receive a request for a cryptocurrency transaction. For example, the request may be to transfer an amount of cryptocurrency from a first address associated with the cryptocurrency to a second address associated with the cryptocurrency. The request to transfer an amount of cryptocurrency may be a request to send cryptocurrency to another digital wallet. The request to transfer an amount of cryptocurrency may be a request to receive cryptocurrency, for example, from another digital wallet. In some examples, the request may include information relating to one or more of: an identity of a holder of cryptocurrency, account information of a cryptocurrency account of a sender or recipient of cryptocurrency, a type of cryptocurrency to be used in the transaction, an amount of cryptocurrency, and the like.

In some implementations, the financial transaction module 154 may be configured to determine if the request is associated with a master key. In some implementations, determining whether the request is associated with a master key may be determined by referencing information in the request with a database (e.g., account database 156). The determination may also be part of a determination of whether a user associated with the request is registered.

In some implementations, the financial transaction module 154 may be configured to determine if the request is associated with an account stored on an HSM. In some implementations, determining whether the request is associated with an account stored on an HSM may be determined by referencing information in the request with a database (e.g., account database 156). The database may contain references to accounts and/or digital wallets and related information without storing actual values of public/private key pairs associated with the digital wallets. The financial transaction module 154 may further be configured to send transaction data to the HSM 152. For example, the transaction data may comprise an amount of cryptocurrency to transfer to an address as well as account information associated with cryptocurrency stored in the digital wallet.

In some implementations, the financial transaction module 154 may be configured to receive a digitally signed transaction. The digitally signed transaction may be configured (e.g., by the HSM 152) for sending to a distributed network (e.g., distributed network 104) for recording on a distributed ledger (e.g., distributed ledger 130). The digitally signed transaction stored on the distributed ledger may complete a cryptocurrency transaction. In general, the HSM 152 may use cryptographic keys, such as those described above to digitally sign the transaction in way that complies with smart contracts in blockchain and distributed ledger technology environments, or to enable authentication. In some implementations, the signed transaction is transmitted or broadcast to a distributed network (e.g., distributed network 104). For example, the signed transaction may be transmitted or broadcast to cryptocurrency verification nodes that are part of a distributed network.

In some implementations, the financial transaction module 154 may be configured to store a cryptocurrency transaction and the digital signature in a distributed ledger. In some implementations, the financial transaction module 154 may be configured to transmit or broadcast a signed transaction signed by a private key to a distributed network (e.g., distributed network 104). For example, the signed transaction may be transmitted or broadcast to cryptocurrency verification nodes that are part of a distributed network. Alternatively, in another example the signed transaction may be sent to a user device (e.g., an individual computing device) before being transmitted or broadcast to cryptocurrency verification nodes that are part of a distributed network. Once verified by cryptocurrency verification nodes, the transaction may be recorded in a cryptocurrency blockchain associated with the distributed network. The blockchain may be a chronological and/or public ledger of all cryptocurrency transactions that have been executed for the respective cryptocurrency.

In some implementations, the financial transaction module 154 may be configured to determine if a request is associated with an account identifier. In some implementations, determining whether the request is associated with an account identifier is determined by referencing information in the request with a database (e.g., account database 156). The determination may also be part of the determination of whether a user associated with the request is registered. The financial transaction module 154 may further be configured to determine if the request is associated with a counter. In some implementations, a counter may be used so a different private key of a private/public key pair can be used for each transaction. For example, a different private key can be used for each transaction associated with a digital wallet.

The account database 156 may be configured to store account information. The account information may store an indicator of one or more master keys that are associated with the account information. Account database 156 may include, but are not limited to relational databases, hierarchical databases, distributed databases, in-memory databases, flat file databases, XML databases, NoSQL databases, graph databases, and/or a combination thereof.

Distributed network 104 may include distributed ledgers 130 and/or databases 132. The various components of distributed network 104 may be configured to perform one or more functions as described herein. The one or more functions may be performed by other components as described in distributed network 104 and by a combination of one or more components of distributed network 104. The distributed network 104 may comprise a plurality of nodes that store and/or modify distributed ledgers 130 once consensus of the transaction is reached among the plurality of nodes using a consensus algorithm. A distributed ledger in distributed network 104 may store cryptocurrency transactions executed by computing systems (e.g., a digital wallet). A distributed network may be publicly accessible and/or have restricted access. The distributed network 104 may comprise one or more distributed ledger data structures comprising a blockchain. This distributed ledger data structure may be replicated among some or all of the nodes in the distributed network 104. Blockchain transactions or records may be time-stamped and bundled into blocks where each block is identified by its cryptographic hash called the consensus proof. The consensus proof may be determined by performing complex cryptographic computations with a consensus algorithm. In some implementations, the consensus proof may be determined by any consensus algorithm including proof of stake and the like. The distributed ledger data structure may be a mutation-resistant and/or durable data structure which maintains records of the blockchain transactions that are tamper-resistant. Once a blockchain transaction is recorded in a block, it cannot be altered or deleted.

Some or all of the data and transactions related to system 100 in FIG. 1 may be stored using one or more databases 132 in the distributed network 104. Databases may include but are not limited to relational databases, hierarchical databases, distributed databases, in-memory databases, flat file databases, XML databases, NoSQL databases, graph databases, and/or a combination thereof.

Figure 2:
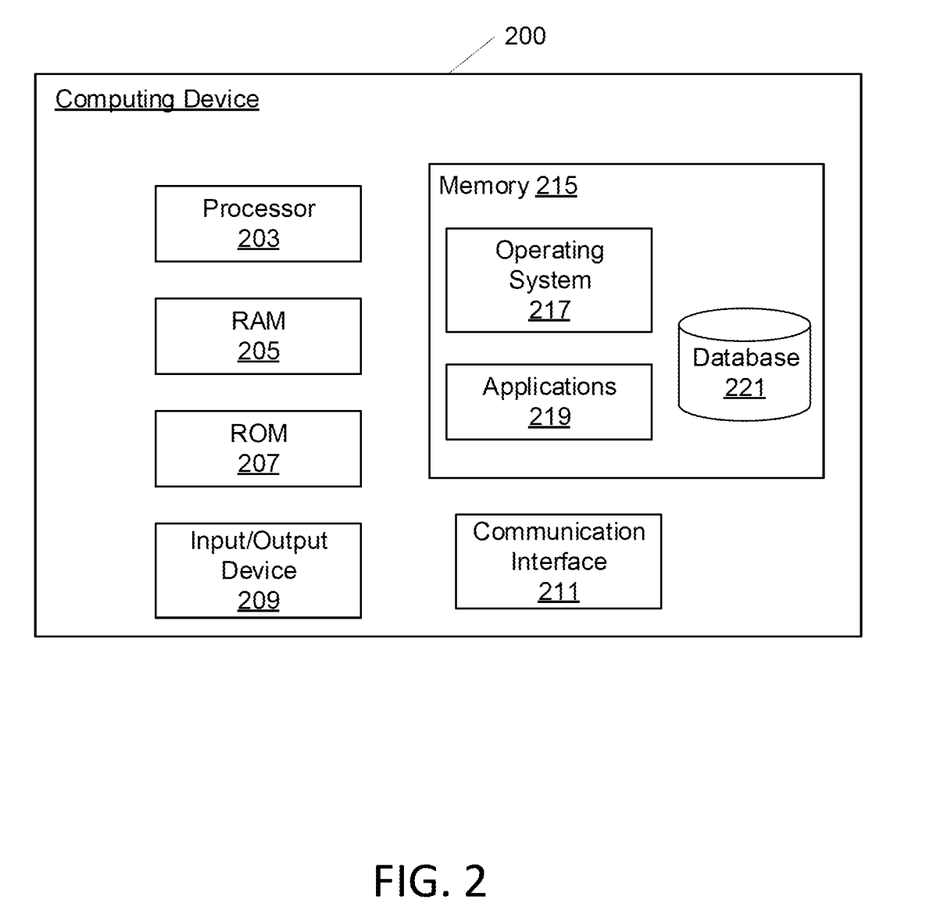
FIG. 2 depicts an illustrative computing system architecture that may be used in accordance with one or more illustrative aspects described herein.

Turning now to FIG. 2, a computing device 200 that may be used with one or more of the computational systems is described. The computing device 200 may include a processor 203 for controlling the overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smartphone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203, allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read-only memory (ROM) 207, electronically erasable programmable read-only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, the functionality of the various components may be combined and/or performed by a single component and/or multiple computing devices in communication without departing from the invention.

Methods and Algorithms Related to Cryptocurrency Processing Systems

Figure 3:
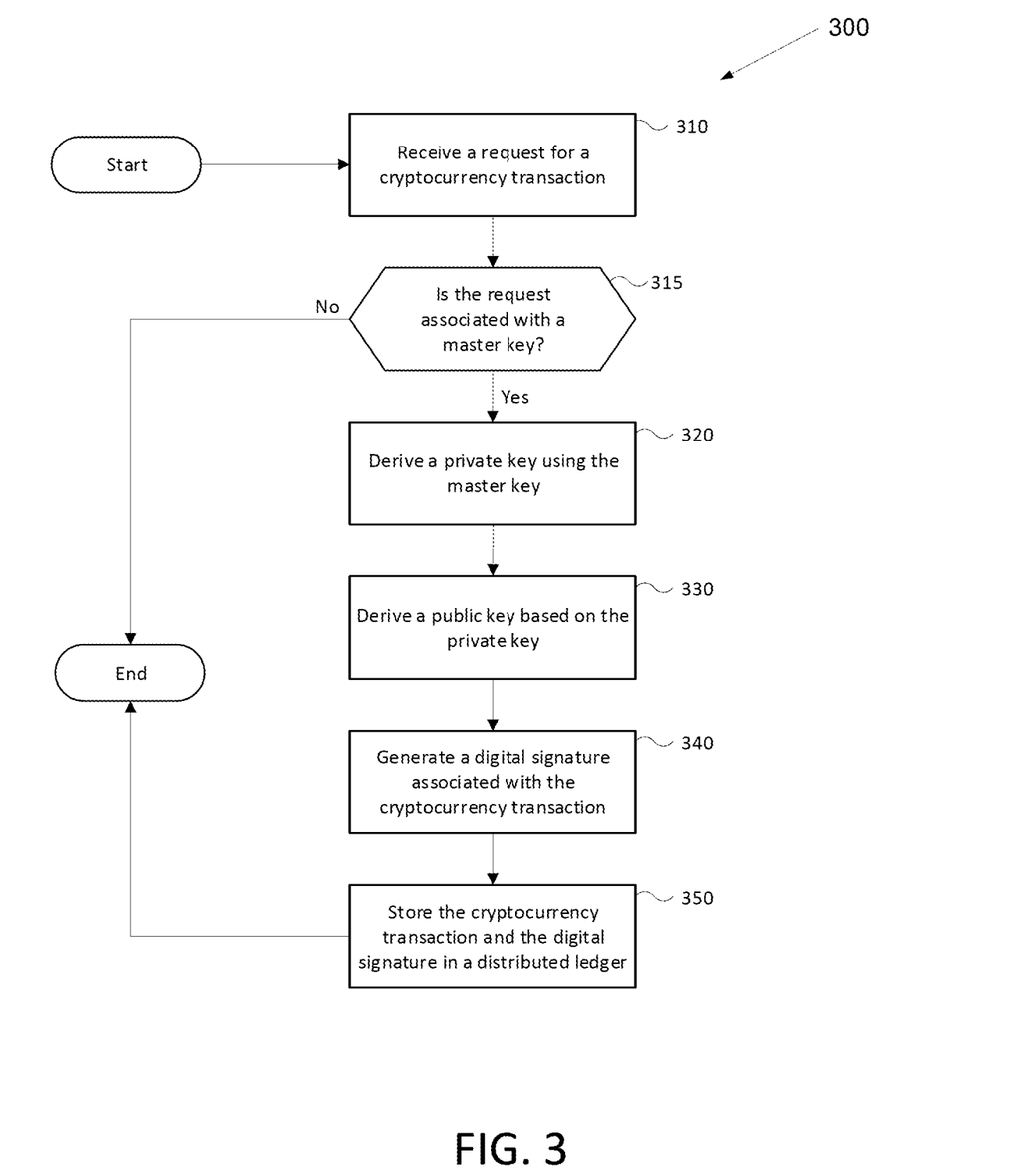
FIG. 3 depicts a flowchart showing an example method for processing a cryptocurrency transaction using a secured master key for use in some implementations.

FIG. 3 depicts a process 300 showing an example method or algorithm for processing a cryptocurrency transaction using a secured master key. The secured master key may be used to derive one or more asymmetric key pairs for use in the cryptocurrency transaction. The method or algorithm may be used in some implementations as described herein. The method may be implemented or performed, for example, by one or more of the systems as discussed in connection with FIGS. 1 and 2. The method may be implemented or performed, for example, by one or more computing systems 108. In some embodiments, the actions in the flowchart may be performed in a different order and with different, fewer, or additional actions than those illustrated in FIG. 3. Actions may be combined and/or divided into sub-actions in some implementations.

Process 300 begins in step 310, where a computing device (e.g., the computing system 108) may receive a request for a cryptocurrency transaction. The request may be to transfer an amount of cryptocurrency from a first address associated with the cryptocurrency to a second address associated with the cryptocurrency. The request to transfer an amount of cryptocurrency may be a request to send cryptocurrency to another digital wallet (e.g., an address associated with a second digital wallet). The request to transfer an amount of cryptocurrency may be a request to receive cryptocurrency. The request may be sent by an individual computing device 102 to a computing system 108. In some examples, the request may include information relating to one or more of: an identity of a holder of cryptocurrency, account information of a cryptocurrency account of a sender or recipient of cryptocurrency, a type of cryptocurrency to be used in the transaction, an amount of cryptocurrency, and the like. In some arrangements, the request is transmitted from a user device (e.g., a personal computer, a smartphone, individual computing device 102) and received by a computing system 108 (e.g., financial transaction module 154 of a computing system 108). In other arrangements, a request may be initiated by an employee of a financial institution entering data into a computing system (e.g., an employee terminal connected to the server of a financial institution) during a person-to-person interaction. For example, a holder of cryptocurrency may walk into a branch location of a financial institution and initiate the deposit request via interaction with a teller at the branch. In some implementations, receiving a request may further include a determination of whether a user associated with the request is registered. In some implementations, the user may be registered if their identity and account information is stored in a computing system 108 (e.g., in account database 156). Generally, the user may be registered if the user already has an account associated with a cryptocurrency with a computing system (e.g., computing system 108).

In step 315, the computing device may determine if the request is associated with a master key (315). In some implementations, determining whether the request is associated with a master key may be determined by referencing information in the request with a database (e.g., account database 156). The determination may also be part of a determination of whether a user associated with the request is registered. If the request is not associated with a master key (315: NO), then the process 300 may end.

However, if the request is associated with a master key (315: YES), the computing device may derive a private key using the master key in step 320. In some implementations, the private key may be derived inside a secure module (e.g., an HSM 152). In some implementations, deriving a private key may include combining the master key with a number to create a uniquely derived key. The number may be an account number associated with the request. The number may be another predetermined number that is associated with an account number. The uniquely derived key may be used as a private key of a private/public key pair. In some implementations, the uniquely derived key used as a private key may be re-created using the master key and the number (e.g., an account number associated with the request). The master key may be a key generated from a seed phrase. The seed phrase may allow for the re-creation or recovery of a plurality of private keys that are derived from the master key. The master key may allow for the generation of derived private keys. Additionally or alternatively, the private keys may be derived using an elliptic curve, RSA, or any other suitable asymmetric key derivation function. In one example, a hardware security module (e.g., HSM 152) may use the master key to derive a plurality of private keys using elliptic curve cryptography. Each of the plurality of private keys may be associated with a user.

In step 330, the computing device may derive a public key, for example, based on the private key. In some implementations, the public key is mathematically derived from a private key. In some implementations, this step may be performed inside a secure module (e.g., an HSM). Performing the steps inside an HSM allows them to be performed without any of the keys being exposed outside of the HSM. In another implementation, the public key is derived by projecting a line through points on an elliptic curve. Additionally or alternatively, the private keys may be derived using an elliptic curve, RSA, or any other suitable asymmetric key derivation function. In some of the implementations, the public key associated with the private key may be re-created (e.g., derived) by first deriving the private key.

In step 340, the computing device may generate a digital signature associated with the cryptocurrency transaction. For example, the derived private key may be used to sign data. In another example, the derived private key may be used to sign a cryptocurrency transaction using data associated with the request. In general, cryptographic keys such as the derived private/public key pair may be used to digitally sign data in way that complies with smart contracts in a blockchain and/or distributed ledger technology environments, or to enable entity authentication.

In step 350, the computing device may store the cryptocurrency transaction and the digital signature in a distributed ledger. In some implementations, the signed transaction signed by the private key may be transmitted or broadcast to a distributed network (e.g., distributed network 104). For example, the signed transaction may be transmitted or broadcast to cryptocurrency verification nodes that are part of a distributed network. Alternatively, in another example the signed transaction may be first sent a user device (e.g., an individual computing device) before being transmitted or broadcast to cryptocurrency verification nodes that are part of a distributed network. Once verified by cryptocurrency verification nodes, the transaction may be recorded in a cryptocurrency blockchain associated with the distributed network. The blockchain may be a chronological and public ledger of all cryptocurrency transactions that have been executed for the respective cryptocurrency.

Figure 4:
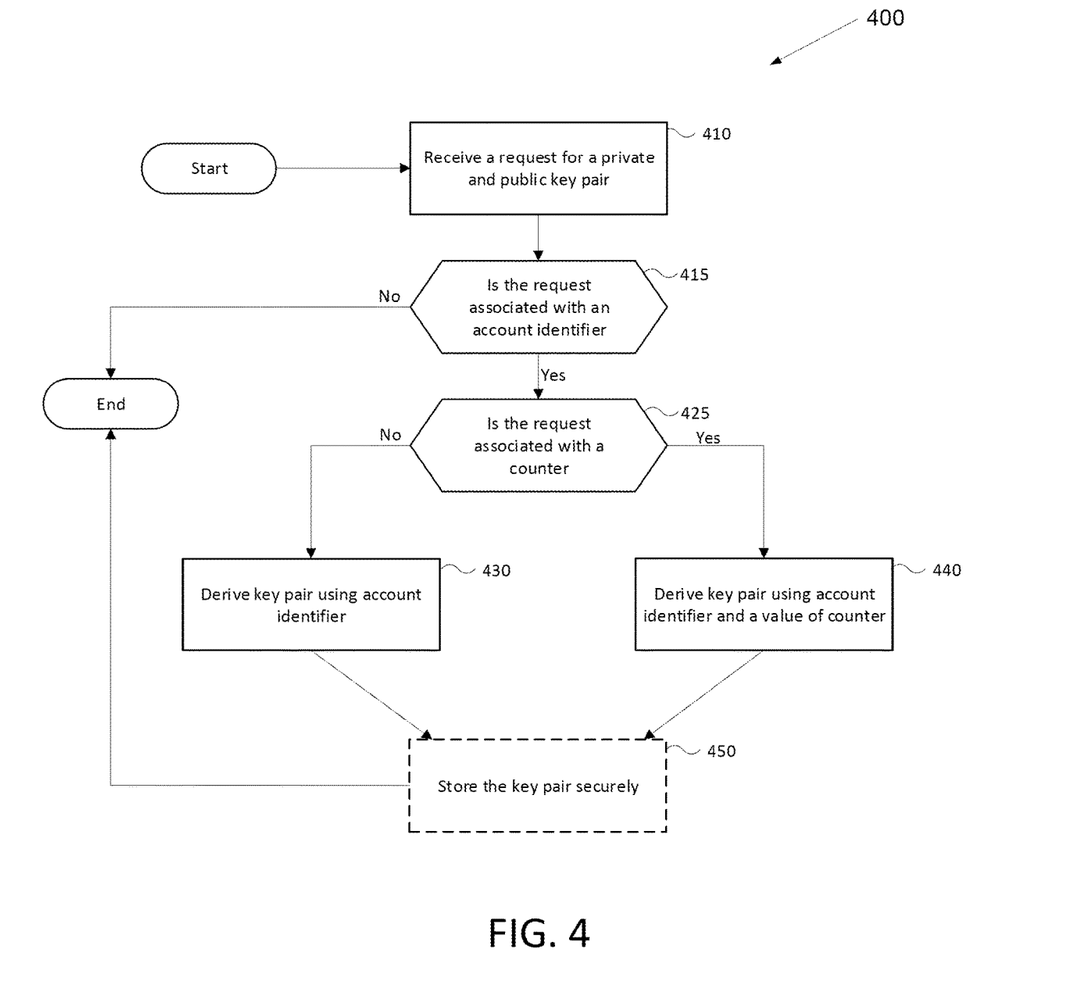
FIG. 4 depicts a flowchart showing an example method for deriving a private and public key pair for use in some implementations.

New asymmetric key pairs comprising a private and public key pair may be generated when needed. For example, a new asymmetric key pair may be generated when creating a new digital wallet for storing cryptocurrency. FIG. 4 depicts a process 400 showing an example method or algorithm for deriving a private and public key pair. The method or algorithm may be used in some implementations as described herein. The method may be implemented or performed, for example, by one or more of the systems as discussed in connection with FIGS. 1 and 2. The method may be implemented or performed, for example, by one or more HSMs 152. In some embodiments, the actions in the flowchart may be performed in a different order and with different, fewer, or additional actions than those illustrated in FIG. 4. Actions may be combined and/or divided into sub-actions in some implementations.

Process 400 begins in step 410, where a computing device may receive a request for a private and public key pair (410). The request may be to create a new digital wallet for storing cryptocurrency. In some implementations, the new digital wallet may be created by, stored in, and/or managed by an HSM (e.g., HSM 152). The request may be sent by an individual computing device 102 to a computing system 108. In some examples, the request may include information relating to one or more of an identity of a holder of cryptocurrency, account information of a cryptocurrency account, a type of cryptocurrency to be held in the digital wallet, an amount of cryptocurrency to be held in the digital wallet, and the like. In some arrangements, the request is transmitted from a user device (e.g., a personal computer, a smartphone, individual computing device 102) and received by a computing system 108 (e.g., financial transaction module 154 of a computing system 108). In other arrangements, a request may be initiated by an employee of a financial institution entering data into a computing system (e.g., an employee terminal connected to the server of a financial institution) during a person-to-person interaction. For example, a holder of cryptocurrency may walk into a branch location of a financial institution and request a new secure digital wallet managed by an HSM (e.g., HSM 152). In some implementations, receiving a request may further include determining whether a user associated with the request is registered. In some implementations, the user may be registered if their identity and account information is stored in a computing system 108 (e.g., in account database 156). Generally, the user may be registered if the user already is associated with a digital wallet by a computing system (e.g., computing system 108). For example, a user may already be registered because they have one or more digital wallets already associated with one or more accounts.

In step 415, the computing device may determine if the request is associated with an account identifier. In some implementations, determining whether the request is associated with an account identifier may be determined by referencing information in the request with a database (e.g., account database 156). The determination may also be part of a determination of whether a user associated with the request is registered. If the request is not associated with an account identifier (415: NO), then the process 400 may end.

However, if the request is associated with an account identifier (415: YES), the computing device may determine if the request is associated with a counter, in step 425. In some implementations, a counter may be used so a different private key of a private/public key pair can be used for each transaction. For example, a counter may increment in value for each transaction. In another example of utilizing a counter, a different private key can be used for each transaction associated with a digital wallet. The digital wallet may be managed by a hardware security module (e.g., HSM 152).

If the request is not associated with a counter (425: NO), then the computing device may derive a key pair using the account identifier, in step 430. Deriving a key pair comprises initially deriving a private key. A private key may be derived using a master key. In some implementations, this step may be performed inside a secure module (e.g., an HSM). Performing the steps inside an HSM allows for them to be performed without any of the keys being exposed outside of the HSM. In some implementations, deriving a private key may include combining the master key with a number to create a uniquely derived key. The number may be an account number associated with the request. The number may be another predetermined number that is associated with an account number. The uniquely derived key may be used as the private key of the private/public key pair. In some implementations, the uniquely derived key may be re-creatable using the master key and the number (e.g., an account number associated with the request). The master key may be a key generated from a seed phrase. The master seed may allow for the re-creation or recovery of a plurality of private keys that are derived from the master key. The master key may allow for the generation of derived private keys. In some implementations, this may be accomplished through use of an elliptic curve. The public key may be mathematically derived from the private key. A public key may be derived from the private key to form a public/private key pair. The public key may be derived by projecting elliptic curve points. Additionally or alternatively, the private keys may be derived using an elliptic curve, RSA, or any other suitable asymmetric key derivation function. In some implementations, deriving the public key may be re-creatable using the master key and the number (e.g., an account number associated with the request) by first deriving the private key.

If the request is associated with a counter (425: YES), then the computing device may derive a key pair using an account identifier and a value of the counter, in step 440. Deriving a key pair comprises initially deriving a private key. A private key may be derived using a master key. In some implementations, this step may be performed inside a secure module (e.g., an HSM). In some implementations, deriving a private key may include combining the master key with a number and a counter to create a uniquely derived key. The number may be an account number associated with the request. The number may be another predetermined number that is associated with an account number. The uniquely derived key associated with the counter value may be used as the private key of the private/public key pair. In some implementations, the uniquely derived key used as a private key is re-creatable using the master key, the number (e.g., an account number associated with the request), and the counter. The master key may be a key generated from a seed phrase. The seed phrase may allow for the re-creation or recovery of a plurality of private keys that are derived from the master key. The master key may allow for the generation of derived private keys. In some implementations, this may be accomplished through use of an elliptic curve. A public key based on the private key may be derived to form a public/private key pair. In some implementations, the public key is mathematically derived from the private key. The public key may be derived by projecting elliptic curve points. Additionally or alternatively, the private keys may be derived using an elliptic curve, RSA, or any other suitable asymmetric key derivation function. In some implementations, deriving the public key associated with the private key as public/private key pair is re-creatable using the master key, the number (e.g., an account number associated with the request), and the counter by first deriving the private key.

In step 450, the computing device may optionally store the key pair securely. In some implementations the key pair may be stored in a secure memory (e.g., secure memory 166) by an HSM (e.g., HSM 152). In some implementations, an HSM (e.g., HSM 152) may store the key pair in a digital wallet. The digital wallets managed by an HSM may be stored in a secure memory (e.g., secure memory 166). The HSM may use a wallet controller (e.g., wallet controller 162) to manage digital wallets stored by the HSM.

In some implementations, the key pair is not stored but instead is rederived as needed. For example, the key pair is initially derived and used sign a transaction receiving an amount of cryptocurrency at an address. The key pair may be rederived at a later time, using the method described in step 430, to sign a transaction sending some or all the cryptocurrency to another address. Rederiving the key pair may require storing the account identifier. If a counter is used (425: YES), then the counter may also be stored. For example, the account identifier and/or counter could be stored securely in a server-side database. In some implementations, the address derived from the public key of the key pair may be stored for use in future transactions. The stored address may be associated with one or more of an identifier (e.g., account identifier, user identifier, etc.), counter value, and/or key index (e.g., an index used for master keys allowing for different master keys to be used). For example, a key index may be used to differentiate different segments of users.

Figure 5:
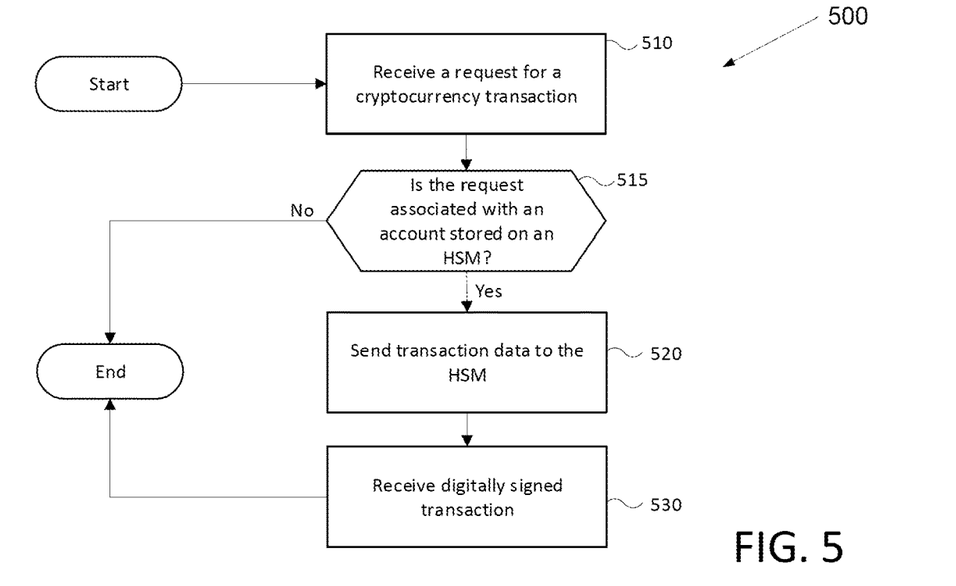
FIG. 5 depicts a flowchart showing an example method for processing a request to digitally sign a transaction for use in some implementations.

Generated keys, such as private keys of a private and public key pair, may be used to digitally sign data. The data may be related to a cryptocurrency transaction. FIG. 5 depicts a process 500 showing an example method or algorithm for processing a request to digitally sign a transaction. The method or algorithm may be used in some implementations as described herein. The method may be implemented or performed, for example, by one or more of the systems as discussed in connection with FIGS. 1 and 2. The method may be implemented or performed, for example, by one or more computing systems 108. In some embodiments, the actions in the flowchart may be performed in a different order and with different, fewer, or additional actions than those illustrated in FIG. 5. Actions may be combined and/or divided into sub-actions in some implementations.

Process 500 begins in step 510, where a computing device may receive a request for a cryptocurrency transaction. The request may be to transfer an amount of cryptocurrency from a first address associated with the cryptocurrency to a second address associated with the cryptocurrency. The request to transfer an amount of cryptocurrency may be a request to send cryptocurrency to another digital wallet (e.g., an address associated with a digital wallet). The request to transfer an amount of cryptocurrency may be a request to receive cryptocurrency. The request may be sent by a user computing device (e.g., an individual computing device 102) to a computing system (e.g., computing system 108). In some examples, the request may include information relating to one or more of an identity of a holder of cryptocurrency, account information of a cryptocurrency account of a sender or recipient of cryptocurrency, a type of cryptocurrency to be used in the transaction, an amount of cryptocurrency, and the like. In some arrangements, a request may be initiated by an employee of a financial institution entering data into a computing system (e.g., an employee terminal connected to the server of a financial institution) during a person-to-person interaction. For example, a holder of cryptocurrency may walk into a branch location of a financial institution and initiate the deposit request via interaction with a teller at the branch. In some implementations, receiving a request may further include a determination of whether a user associated with the request is registered. In some implementations, the user may be registered if their identity and account information is stored in a computing system 108 (e.g., in account database 156). Generally, the user may be registered if the user already has an account associated with a cryptocurrency with a computing system (e.g., computing system 108).

In step 515, the computing device may determine if the request is associated with an account stored on an HSM. In some implementations, determining whether the request is associated with an account stored on an HSM may be determined by referencing information in the request with a database (e.g., account database 156). The database may contain references to accounts and/or digital wallets and related information without storing actual values public/private key pairs associated with the digital wallets. If the request is not associated with an account stored on an HSM (515: NO), then the process 300 may end.

However, if the request is associated with an account stored on an HSM (515: YES), then the computing device may send transaction data to the HSM in step 520. For example, the transaction data may comprise an amount of cryptocurrency to transfer to an address as well as account information associated with cryptocurrency stored on the HSM.

In step 530, the computing device may receive a digitally signed transaction. The digitally signed transaction may be configured (e.g., by the HSM) for sending to a distributed network (e.g., distributed network 104) for recording on a distributed ledger (e.g., distributed ledger 130). The digitally signed transaction stored on the distributed ledger may complete the cryptocurrency transaction. In general, the HSM may use cryptographic keys such as those derived private/public key pairs generated using a master key using the account information) to digitally sign the transaction in way that complies with smart contracts in blockchain and distributed ledger technology environments, or to enable entity authentication. In some implementations, the signed transaction is transmitted or broadcast to a distributed network (e.g., distributed network 104). For example, the signed transaction may be transmitted or broadcast to cryptocurrency verification nodes that are part of a distributed network. Alternatively, in another example the signed transaction is first sent a user device (e.g., an individual computing device) before being transmitted or broadcast to cryptocurrency verification nodes that are part of a distributed network. Once verified by cryptocurrency verification nodes, the transaction may be recorded in a cryptocurrency blockchain associated with the distributed network. The blockchain is a chronological and public ledger of all cryptocurrency transactions that have been executed for the respective cryptocurrency.

Figure 6:
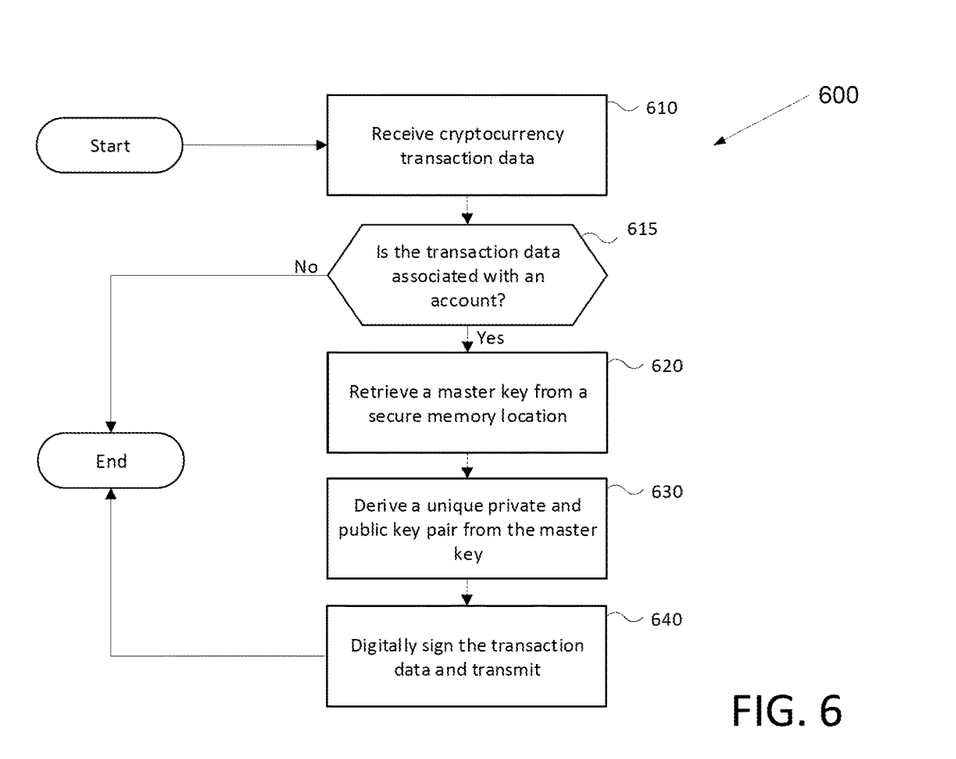
FIG. 6 depicts a flowchart showing an example method for digitally signing a transaction for use in some implementations.

Secure hardware (e.g., HSM 152) may be used to digitally sign data, such as a cryptocurrency transaction. FIG. 6 depicts a process 600 showing an example method or algorithm for digitally signing a transaction using secure hardware, such as HSM 152. The method or algorithm may be used in some implementations as described herein. The method may be implemented or performed, for example, by one or more of the systems as discussed in connection with FIGS. 1 and 2. The method may be implemented or performed, for example, by one or more HSMs 152. In some embodiments, the actions in the flowchart may be performed in a different order and with different, fewer, or additional actions than those illustrated in FIG. 6. Actions may be combined and/or divided into sub-actions in some implementations.

Process 600 begins in step 610, where a computing device may receive cryptocurrency transaction data. The transaction data may comprise an amount of cryptocurrency to transfer to an address as well as account information associated with cryptocurrency. The request may be to transfer an amount of cryptocurrency from a first address associated with the cryptocurrency to a second address associated with the cryptocurrency. The request to transfer an amount of cryptocurrency may be a request to send cryptocurrency to another digital wallet (e.g., an address associated with a digital wallet). The request to transfer an amount of cryptocurrency may be a request to receive cryptocurrency. In some examples, the request may include information relating to one or more of an identity of a holder of cryptocurrency, account information of a cryptocurrency account of a sender or recipient of cryptocurrency, a type of cryptocurrency to be used in the transaction, an amount of cryptocurrency, and the like.

In step 615, the computing device may include determining if the transaction data is associated with an account. In some implementations, determining whether the request is associated with an account stored on an HSM is determined by referencing information in the request with a digital wallet (e.g., using wallet controller 162). In some implementations, determination if the request is associated with an account may comprise retrieving account information from a secure memory (e.g., secure memory 166). The database may contain references to accounts and/or digital wallets and related information without storing actual values public/private key pairs associated with the digital wallets. If the request is not associated with an account (615: NO), then the process may end.

However, if the request is associated with an account (615: YES), the computing device may retrieve a master key from a secure memory location in step 620. In some implementations the secure memory location (e.g., secure memory 166) may be part of the HSM (e.g., HSM 152).

In step 630, the computing device may derive a unique private and public key pair from the master key. Deriving a key pair comprising a public and private key pair includes deriving a private key. A private key may be derived using the master key. In some implementations, deriving a private key may include combining the master key with a number to create a uniquely derived key. The number may be an account number associated with the request. The number may be another predetermined number that is associated with an account number. The uniquely derived key may be used as the private key of the private/public key pair. In some implementations, the uniquely derived key used as a private key is re-creatable using the master key and the number (e.g., an account number associated with the request).

In 640, the computing device may digitally sign the transaction data and transmit. The derived private key may be used to digitally sign transaction data formatted to be transmitted or broadcast to a distributed network. The derived private key may be used to sign a cryptocurrency transaction using data included in the transaction data. In general, cryptographic keys such as the derived private/public key pair may be used to digitally sign data in way that complies smart contracts in blockchain and distributed ledger technology environments, or to enable entity authentication. The signed data may be formatted for transmission or broadcast to a distributed network (e.g., distributed network 104) to store the cryptocurrency transaction and the digital signature in a distributed ledger (e.g., distributed ledger 130). For example, the signed transaction may be formatted for transmission or broadcast to cryptocurrency verification nodes that are part of a distributed network (e.g., distributed network 104). Alternatively, in another example the signed transaction is first sent a computing system (e.g., computing system 108) and/or a computing device (e.g., an individual computing device 102) before being transmitted or broadcast to cryptocurrency verification nodes that are part of a distributed network. Once verified by cryptocurrency verification nodes, the transaction may be recorded in a cryptocurrency blockchain associated with the distributed network. The blockchain is a chronological and public ledger of all cryptocurrency transactions that have been executed for the respective cryptocurrency.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, Perl, or any appropriate scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is, therefore, to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
receiving, by a computing device, a request from a user for a cryptocurrency transaction and an account identifier for a cryptocurrency account associated with the user;
retrieving, from a secure memory location associated with a hardware security module, a master key, wherein the master key is associated with a financial institution;
deriving, by the hardware security module and using the master key and the account identifier, a private key associated with the user;
deriving, based on the private key, a public key, wherein the hardware security module is configured to store the private key and the public key in a digital wallet associated with the account identifier;
generating, by the hardware security module and using the private key, a digital signature associated with the cryptocurrency transaction; and
storing the cryptocurrency transaction and the digital signature in a distributed ledger.

2. The computer-implemented method of claim 1, further comprising:
receiving a second request from a second user for a second cryptocurrency transaction;
deriving, by the hardware security module and using the master key, a second private key associated with the second user;
deriving, based on the second private key, a second public key;
generating, by the hardware security module and using the second private key, a second digital signature associated with the second cryptocurrency transaction; and
storing the second cryptocurrency transaction and the second digital signature in the distributed ledger.

3. The method of claim 1, wherein the storing the cryptocurrency transaction and the digital signature in the distributed ledger comprises transmitting the digital signature to the distributed ledger.

4. The method of claim 1, wherein the deriving the private key further comprises deriving the private key using a value of a counter.

5. The method of claim 1, further comprising deriving, by the hardware security module, the private key and the public key from the master key, the account identifier, and diversification data received with the request.

6. The method of claim 1, wherein the private key and the public key are maintained securely within the hardware security module.

7. The method of claim 1, wherein the private key and the public key from the master key are derived using elliptic curve cryptography.

8. A computing system comprising:
a hardware security module;
one or more processors; and
memory storing instructions that, when executed by the one or more processors, cause the computing system to:
receive a request from a user for a cryptocurrency transaction and an account identifier for a cryptocurrency account associated with the user;
retrieve, by the hardware security module, from a secure memory location associated with the hardware security module, a master key, wherein the master key is associated with a financial institution;
derive, by the hardware security module and using the master key and the account identifier, a private key associated with the user;
derive, by the hardware security module, a public key based on the private key, wherein the hardware security module is configured to store the private key and the public key in a digital wallet associated with the account identifier;
generate, by the hardware security module, using the private key, a digital signature associated with the cryptocurrency transaction; and
store the cryptocurrency transaction and the digital signature in a distributed ledger by transmitting the digital signature to the distributed ledger.

9. The computing system of claim 8, wherein the memory is further storing instructions that, when executed by the one or more processors, cause the computing system to derive, by the hardware security module, the private key based on a value of a counter.

10. The computing system of claim 8, wherein the memory is further storing instructions that, when executed by the one or more processors, cause the computing system to derive, by the hardware security module, the private key and the public key from the master key and the public key from the master key, the account identifier, and diversification data received with the request.

11. The computing system of claim 8, wherein the private key and the public key are maintained securely within the hardware security module.

12. The computing system of claim 8, wherein the private key and the public key from the master key are derived using elliptic curve cryptography.

13. A non-transitory computer-readable storage medium comprising instructions that, when executed, cause a computing system to:
receive a request from a user for a cryptocurrency transaction, the request comprising an account identifier for a cryptocurrency account associated with the user;
retrieve, by a hardware security module, from a secure memory location associated with the hardware security module, a master key, wherein the master key is associated with a financial institution;
derive, by the hardware security module and using the master key and the account identifier, a private key associated with the user;
derive, by the hardware security module, a public key based on the private key, wherein the hardware security module is configured to store the private key and the public key in a digital wallet associated with the account identifier;
generate, by the hardware security module, using the private key, a digital signature associated with the cryptocurrency transaction; and
store the cryptocurrency transaction and the digital signature in a distributed ledger by transmitting the digital signature to the distributed ledger.

14. The non-transitory computer-readable storage medium of claim 13, further comprising instructions that, when executed, cause the computing system to derive, by the hardware security module, the private key further based on a value of a counter.

15. The non-transitory computer-readable storage medium of claim 13, further comprising instructions that, when executed, cause the computing system to derive, by the hardware security module, the private key and the public key from the master key and the public key from the master key, the account identifier, and diversification data received with the request.

16. The non-transitory computer-readable storage medium of claim 13, further comprising instructions that, when executed, cause the computing system to derive the private key further based on a value of a counter.

17. The non-transitory computer-readable storage medium of claim 13, further comprising instructions that, when executed, cause the computing system to maintain the private key and the public key securely within the hardware security module.

* * * * *